(12) United States Patent
Fuchigami et al.

(10) Patent No.: US 11,400,873 B2
(45) Date of Patent: Aug. 2, 2022

(54) CLAMP AND WIRE HARNESS

(71) Applicants: SUMITOMO WIRING SYSTEMS, LTD., Yokkaichi (JP); TOYOTA JIDOSHA KABUSHIKI KAISHA, Toyota (JP)

(72) Inventors: Masahiro Fuchigami, Yokkaichi (JP); Kazuma Ogino, Yokkaichi (JP); Yusuke Noda, Toyota (JP)

(73) Assignees: SUMITOMO WIRING SYSTEMS, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 17/029,500

(22) Filed: Sep. 23, 2020

(65) Prior Publication Data
US 2021/0094485 A1    Apr. 1, 2021

(30) Foreign Application Priority Data
Sep. 27, 2019 (JP) .............................. JP2019-177567

(51) Int. Cl.
*B60R 16/02* (2006.01)
*H01B 7/00* (2006.01)

(52) U.S. Cl.
CPC ....... *B60R 16/0215* (2013.01); *H01B 7/0045* (2013.01)

(58) Field of Classification Search
CPC .......................... B60R 16/0215; H01B 7/0045
See application file for complete search history.

(56) References Cited

U.S. PATENT DOCUMENTS 5,402,970 A * 4/1995 Fujishita .................. F16B 2/08
248/71
5,433,625 A * 7/1995 Tsuji ..................... H01R 12/675
439/397

(Continued)

FOREIGN PATENT DOCUMENTS

JP    H09-37443 A    2/1997
JP    H09-250517 A    9/1997
(Continued)

OTHER PUBLICATIONS

Feb. 25, 2022 Office Action Issued in U.S. Appl. No. 17/029,551.
Jun. 7, 2022 Notice of Allowance issued in U.S. Appl. No. 17/029,551.

*Primary Examiner* — William H. Mayo, III
*Assistant Examiner* — Rhadames Alonzo Miller
(74) *Attorney, Agent, or Firm* — Oliff PLC

(57) ABSTRACT

A clamp and wire harness that allow for position adjustment with respect to an object of installation; wherein the clamp holds a tubular member accommodating an electric wire and is fixed to an object of installation. The clamp includes a clamp body, which holds the tubular member, and a core block, which is separate from the clamp body. The clamp body includes a through-hole, which accommodates the core block, inner surfaces opposed to the core block in the through-hole, and a bottom surface. The core block includes a body portion accommodated in the through-hole, a coupling portion to be coupled to the object of installation, and a protrusion that protrudes in a direction orthogonal to a central axis O of the through-hole. The protrusion is opposed to the bottom surface. The body portion is configured to be separated from one of the inner surfaces when contacting the other inner surface.

18 Claims, 8 Drawing Sheets

(56) References Cited

U.S. PATENT DOCUMENTS

| | | |
|---|---|---|
| 5,966,781 A | 10/1999 | Geiger |
| 6,460,642 B1 * | 10/2002 | Hirano .................... B60K 6/442 |
| | | 180/65.1 |
| 2003/0222184 A1 | 12/2003 | Geiger |
| 2004/0154817 A1 * | 8/2004 | Sudo .................... H02G 3/0468 |
| | | 174/481 |
| 2007/0215757 A1 * | 9/2007 | Yuta ...................... F16L 55/035 |
| | | 248/68.1 |
| 2010/0243824 A1 | 9/2010 | Desai et al. |
| 2010/0294564 A1 | 11/2010 | Guthke et al. |
| 2011/0061932 A1 * | 3/2011 | Ogawa ................ B60R 16/0215 |
| | | 174/72 A |
| 2013/0097818 A1 * | 4/2013 | Fukumoto ............ F16B 19/1081 |
| | | 24/305 |
| 2017/0331263 A1 | 11/2017 | Matsumura et al. |
| 2019/0123530 A1 | 4/2019 | Tokuyama et al. |
| 2019/0293103 A1 | 9/2019 | Isaji |

FOREIGN PATENT DOCUMENTS

| | | |
|---|---|---|
| JP | 2012-002323 A | 1/2012 |
| JP | 2013-024255 A | 2/2013 |
| JP | 2013-162542 A | 8/2013 |
| JP | 2013162542 A * | 8/2013 |
| JP | 2016-183678 A | 10/2016 |
| JP | 2017-081375 A | 5/2017 |

* cited by examiner

CLAMP AND WIRE HARNESS

BACKGROUND

1. Field

The present disclosure relates to a clamp and a wire harness.

2. Description of Related Art

A pipe spacer has been known that can be installed in accordance with a space between two pipes (for example, refer to Japanese Laid-Open Patent Publication No. 2016-183678). This type of spacer includes two spacer members that are provided separately, and each spacer member includes a pipe holder that holds pipes. The two spacer members can be installed integrally while varying the space in between. This configuration allows the space between the pipe holders to be adjusted by changing the space between the spacer members. Thus, the pipe spacer can be installed in accordance with the space between two pipes.

The above-described pipe spacer can adjust the positions of the pipe holders. To increase the ease of installing the pipe spacer in an object of installation such as a vehicle, a structure has been considered that allows for position adjustment to absorb, for example, dimensional tolerances between the pipe spacer and the object of installation.

SUMMARY

It is an objective of the present disclosure to provide a clamp and a wire harness that allow for position adjustment with respect to an object of installation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A clamp of the present disclosure is configured to hold a tubular member accommodating an electric wire and be fixed to an object of installation. The clamp includes a clamp body configured to hold the tubular member and a core block that is a component separate from the clamp body. The clamp body includes a through-hole configured to accommodate the core block, an inner surface configured to be opposed to the core block in the through-hole, and a bottom surface. The core block includes a body portion configured to be accommodated in the through-hole, a coupling portion configured to be coupled to the object of installation, and a protrusion that protrudes in a direction orthogonal to a central axis of the through-hole. The protrusion is opposed to the bottom surface. The inner surface includes a first section and a second section that are symmetric with respect to the central axis. The body portion is configured to be separated from the second section when the body portion contacts the first section. In the present description, the "orthogonal direction" includes angles formed by two axes that intersect with each other at an angle close to a right angle.

Another clamp of the present disclosure is configured to hold a tubular member accommodating an electric wire and be fixed to an object of installation. The clamp includes a clamp body configured to hold the tubular member and a core block that is a component separate from the clamp body. The clamp body includes a through-hole configured to accommodate the core block, an inner surface configured to be opposed to the core block in the through-hole, and a bottom surface. The core block includes a body portion configured to be accommodated in the through-hole, a coupling portion configured to be coupled to the object of installation, and a protrusion that protrudes in a direction orthogonal to a central axis of the through-hole. The inner surface includes a first section and a second section that are symmetric with respect to the central axis. The core block is configured to be movable between the first section and the second section in a state in which the protrusion is capable of supporting the bottom surface.

The clamp of the present disclosure allows for position adjustment with respect to an object of installation.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
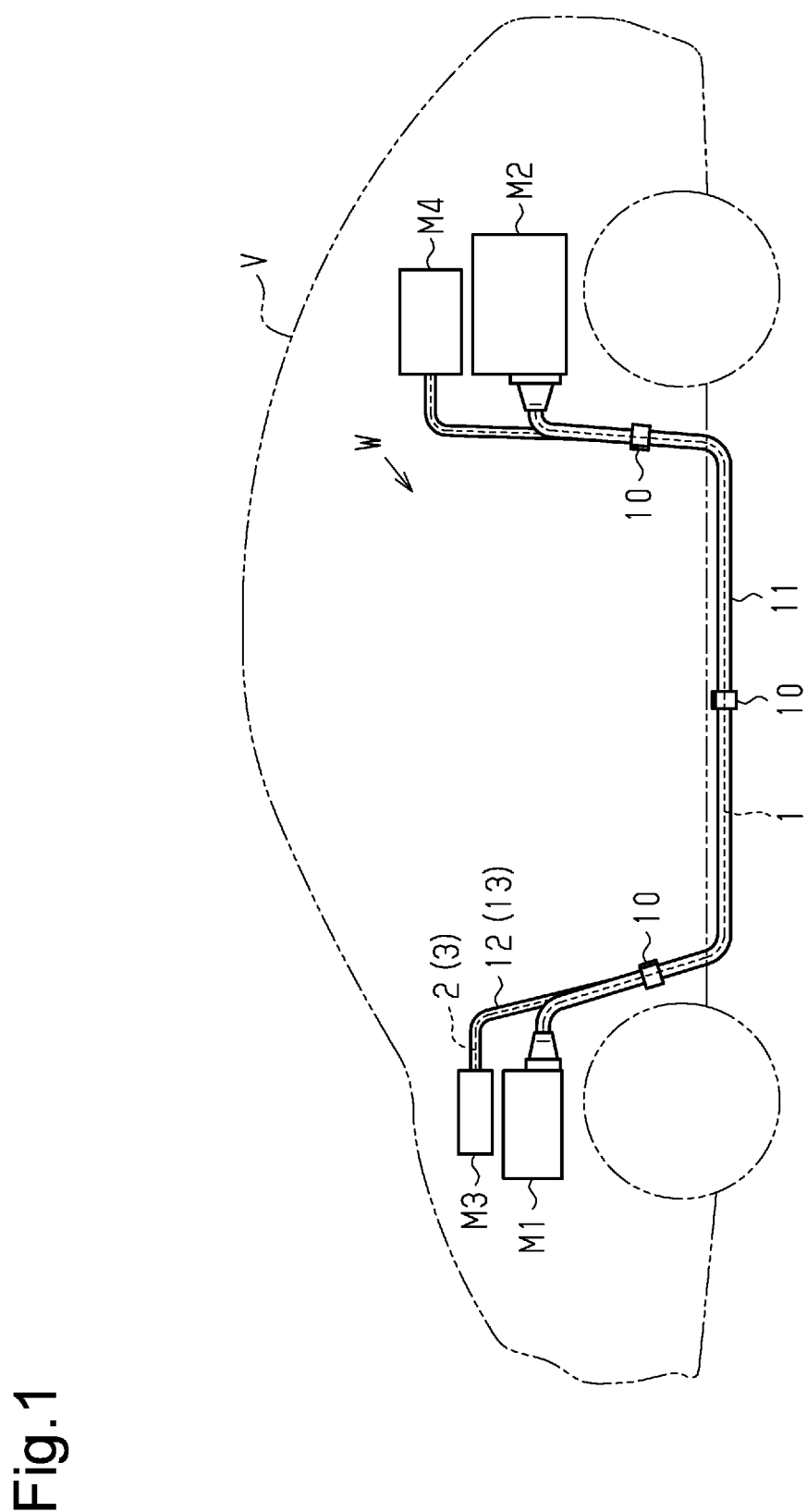
FIG. 1 is a diagrammatic view illustrating a typical configuration of a wire harness according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

DESCRIPTION OF EMBODIMENTS OF PRESENT DISCLOSURE

Embodiments of the present disclosure will now be listed and described.

[1] A clamp of the present disclosure is configured to hold a tubular member accommodating an electric wire and be fixed to an object of installation. The clamp includes a clamp body configured to hold the tubular member and a core block that is a component separate from the clamp body. The clamp body includes a through-hole configured to accommodate the core block, an inner surface configured to be opposed to the core block in the through-hole, and a bottom surface. The core block includes a body portion configured to be accommodated in the through-hole, a coupling portion configured to be coupled to the object of installation, and a protrusion that protrudes in a direction orthogonal to a central axis of the through-hole. The protrusion is opposed to the bottom surface. The inner surface includes a first section and a second section that are symmetric with respect to the central axis. The body portion is configured to be separated from the second section when the body portion contacts the first section.

The core block includes the coupling portion to be coupled to the object of installation and the protrusion. The protrusion is opposed to the bottom surface of the clamp body so as to support the clamp body. This provides a structure that prevents the clamp body from falling off the core block. The core block is configured such that the body portion is separated from the second section when the body portion of the core block contacts the first section of the inner surface of the through-hole of the clamp body. That is, the core block is configured to be movable between the first section and the second section of the inner surface of the through-hole of the clamp body. Accordingly, the clamp is provided that allows for position adjustment with respect to an object of installation to absorb, for example, dimensional tolerances between the clamp and the object of installation.

[2] A clamp of the present disclosure is configured to hold a tubular member accommodating an electric wire and be fixed to an object of installation. The clamp includes a clamp body configured to hold the tubular member and a core block that is a component separate from the clamp body. The clamp body includes a through-hole configured to accommodate the core block, an inner surface configured to be opposed to the core block in the through-hole, and a bottom surface. The core block includes a body portion configured to be accommodated in the through-hole, a coupling portion configured to be coupled to the object of installation, and a protrusion that protrudes in a direction orthogonal to a central axis of the through-hole. The inner surface includes a first section and a second section that are symmetric with respect to the central axis. The core block is configured to be movable between the first section and the second section in a state in which the protrusion is capable of supporting the bottom surface.

The core block includes the coupling portion to be coupled to the object of installation and the protrusion. The protrusion is configured to support the clamp body. This provides a structure that prevents the clamp body from falling off the core block. This core block is movable between the first section and the second section of the inner surface of the through-hole of the clamp body. Accordingly, the clamp is provided that allows for position adjustment with respect to an object of installation to absorb, for example, dimensional tolerances between the clamp and the object of installation.

[3] The core block preferably contains, as a main component, polyacetal plastic.

If the core block contains, as the main component, polyacetal plastic, which is a crystalline plastic, the high self-lubricating property of the crystalline plastic achieves high abrasion resistance and high wear resistance. Further, since the polyacetal plastic has high mechanical properties such as high stiffness and high impact resistance, the configuration is favorable to provide strength to support the clamp body with the protrusion.

In the present description, unless otherwise specified, the expression including "main component" indicates a situation in which other components are contained within a range that does not hinder the functions of the main component, and includes the meaning that the content of the main component is greater than or equal to 50 mass %. That is, various types of additives can be added within a range that does not hinder the functions of the main component, and the various types of additives include a thermal stabilizer, antioxidant, ultraviolet absorber, light stabilizer, crystal nucleating agent, colorant, antistatic agent, hydrolysis inhibitor, lubricant, flame retardant, and elastomer. Also, other plastic compositions may be included within the range that does not hinder the functions.

[4] The clamp preferably includes a cover that is configured to be attached to the clamp body and cover the core block. The protrusion is preferably configured to be accommodated between the bottom surface and the cover.

If the protrusion of the core block is accommodated between the clamp body and the cover member, the core block is prevented from falling off the clamp body before the clamp is installed in the object of installation.

[5] The bottom surface preferably includes a projection that projects in a first direction. The first direction is preferably parallel with a direction in which the central axis extends. The amount by which the projection projects is preferably greater than a thickness of the protrusion in the first direction.

Since the cover first contacts the projection before contacting the core block, the cover is prevented from hindering movement of the core block.

[6] The coupling portion preferably includes a coupling hole used to couple the coupling portion to the object of installation, and an inclined surface adjacent to the coupling hole. The inclined surface is preferably inclined so as to be recessed toward the coupling hole.

If the coupling portion of the core block has the inclined surface, a fastener such as a bolt that protrudes from the object of installation can be guided into the coupling hole of the core block.

[7] The through-hole is preferably shaped like a quadrangular prism. The body portion is preferably shaped like a polygonal prism and includes multiple outer surfaces. The outer surfaces preferably include a rotation preventing surface configured to contact the inner surface in a situation in which the core block rotates about the central axis of the core block.

The rotation preventing surface prevents the clamp body from rotating relative to the core block after the clamp is fixed to the object of installation with the coupling portion of the core block. Accordingly, since rotation of the wire harness is prevented after the clamp is fixed to the object of installation, the ease of installing the wire harness is increased. Since a surface contact is established between the inner surface of the clamp body and the rotation preventing surface of the core block, the force that is generated when the wire harness rotates is dispersed. This prevents the core block and the clamp body from being damaged.

[8] The inner surface is one of two inner surfaces. In a cross section that includes the first section and the second section and is orthogonal to the central axis, a shortest distance A between the two inner surfaces, a width B of the body portion, and a protruding amount C of the protrusion preferably satisfy an expression $C > A - B$.

If this expression is satisfied, the protrusion of the core block is always opposed to the bottom surface of the clamp body to be able to always support the clamp body even in a case in which the core block is moved relative to the clamp body. This provides a structure that prevents the clamp body from falling off the core block.

[9] In a cross section that includes the first section and the second section and is orthogonal to the central axis, a shortest distance D between the inner surface and the body portion and a shortest distance E between a distal end of the protrusion and the projection preferably satisfy an expression $E \geq D$.

If this expression is satisfied, the body portion of the core block and the clamp body contact each other before the distal end of the protrusion and the projection contact each other even in a case in which the core block is moved relative to the clamp body. This establishes a surface contact between the body portion of the core block and the inner surface of the clamp body.

[10] The inner surface is one of two inner surfaces. In a cross section that includes the first section and the second section and is orthogonal to the central axis, a shortest distance A between the two inner surfaces, a width B of the body portion, and a shortest distance F from one end to another end of the inclined surface in a direction orthogonal to the central axis preferably satisfy an expression $F \geq A-B$.

If this expression is satisfied, for example, the distal end of the fastener such as a stud bolt protruding from the object of installation is always in contact with the inclined surface of the recess of the core block in the entire range of movement of the core block relative to the clamp body. Thus, the distal end of the fastener is guided to the coupling hole along the inclined surface of the recess of the core block. That is, the ease of installing the clamp in the object of installation is increased.

[11] A wire harness includes a clamp, the electric wire, and a tubular member configured to accommodate the electric wire.

The use of the above-described clamp provides a wire harness that allows for position adjustment with respect to an object of installation.

Description of Embodiments of Present Disclosure

Specific examples of the clamp and the wire harness according to the present disclosure will now be described with reference to the drawings. In the following description, three directions that are orthogonal to each other (represented by X, Y, and Z in the drawings) are defined as a depth direction X, a width direction Y, and a height direction Z of the clamp. The terms "parallel," "orthogonal," and "horizontal" are not necessarily used in a strict sense, but may be used in cases where elements are generally parallel with each other, orthogonal to each other, or horizontal within ranges in which such configuration achieves the operational advantages of the present embodiment. Also, for the illustrative purposes, some parts of the structures in the drawings may be exaggerated or simplified. Further, the dimensional ratios of portions may be different among the drawings.

Overall Configuration of Wire Harness W

As shown in FIG. 1, a wire harness W electrically connects two, three, or more electrical devices to one another. The wire harness W is installed in, for example, a vehicle V such as a hybrid vehicle or an electric vehicle. The wire harness W includes an electric wire 1 and electric wires 2, 3. The electric wire 1 is a high-voltage electric wire used in a high-voltage circuit. The electric wires 2, 3 are low-voltage electric wires used in a low-voltage circuit. The electric wire 1 electrically connects a device M1, which is, for example, an inverter mounted in a front of a vehicle V, to a device M2, which is, for example, a high-voltage battery mounted in a rear of the vehicle V. The inverter is connected to a wheel-driving motor, which is a power source for driving the vehicle V. The inverter generates AC power from the high-voltage battery and supplies the AC power to the motor. The high-voltage battery is a battery that is capable of supplying a voltage of a few hundred volts. The electric wires 2, 3 electrically connect a device M3, which is, for example, a fuse box mounted in the front of the vehicle V, to a device M4, which is, for example, a low-voltage battery mounted in the rear of the vehicle V. The low-voltage battery is a battery that is capable of supplying a voltage of 12 volts. The wire harness W is routed so as to extend, for example, underneath a floor panel of the vehicle V.

Configuration of Electric Wires 1 to 3

The electric wires 1 to 3 each have an elongated shape extending, for example, in the front-rear direction of the vehicle V. The electric wire 1 can deal with high voltage and high current. The electric wires 1 to 3 each include a core wire made by twisting metal strands and an insulating coating that coats the core wire. The electric wires 1 to 3 may be shielded wires, which have an electromagnetic shield structure against electromagnetic waves, or non-shielded wires, which have no electromagnetic shield structure. For example, one end of the electric wire 1 is connected to the device M1 via a connector, and the other end of the electric wire 1 is connected to the device M2 via a connector. For example, one end of each of the electric wires 2, 3 is connected to the device M3 via a metal terminal, and the other end of each of the electric wires 2, 3 is connected to the device M4 via a metal terminal.

Configuration of Wire Harness W

The wire harness W includes a tubular member 11, which accommodates the electric wire 1, a tubular member 12, which accommodates the electric wire 2, a tubular member 13, which accommodates the electric wire 3, and one or more clamps 10, which hold the tubular members 11 to 13.

Configuration of Tubular Members 11 to 13

The tubular members 11 to 13 each have an elongated tubular shape as a whole. The electric wires 1 to 3 are respectively accommodated in the internal spaces of the tubular members 11 to 13. The tubular members 11 to 13 may be metal or plastic pipes, plastic protectors, flexible corrugated tubes made of plastic, waterproof covers made of rubber, or a combination of any of these. The material for the metal pipe may be a metal such as a copper-based metal, an iron-based metal, or an aluminum-based metal. The material for the plastic protector or a plastic corrugated tube may be, for example, a conductive plastic or a non-conductive plastic. The plastic may be, for example, polyolefin, polyamide, polyester, and ABS plastic. The tubular members 11 to 13 of the present embodiment are pipes made of a metal that has a higher stiffness than that of the electric wires 1 to 3. The tubular members 11 to 13 of the present embodiment are cylindrical. The tubular members 11 to 13 of the present embodiment have a protective function for protecting the electric wires 1 to 3 from water droplets and thrown-up objects and an electromagnetic shielding function for protecting the electric wires 1 to 3 from electromagnetic waves.

The wire harness W is fixed at a predetermined position by attaching the clamps 10 to the tubular members 11 to 13, and then fixing the clamps 10 to the object of installation such as a vehicle body.

Configuration of Clamp 10

Figure 2:
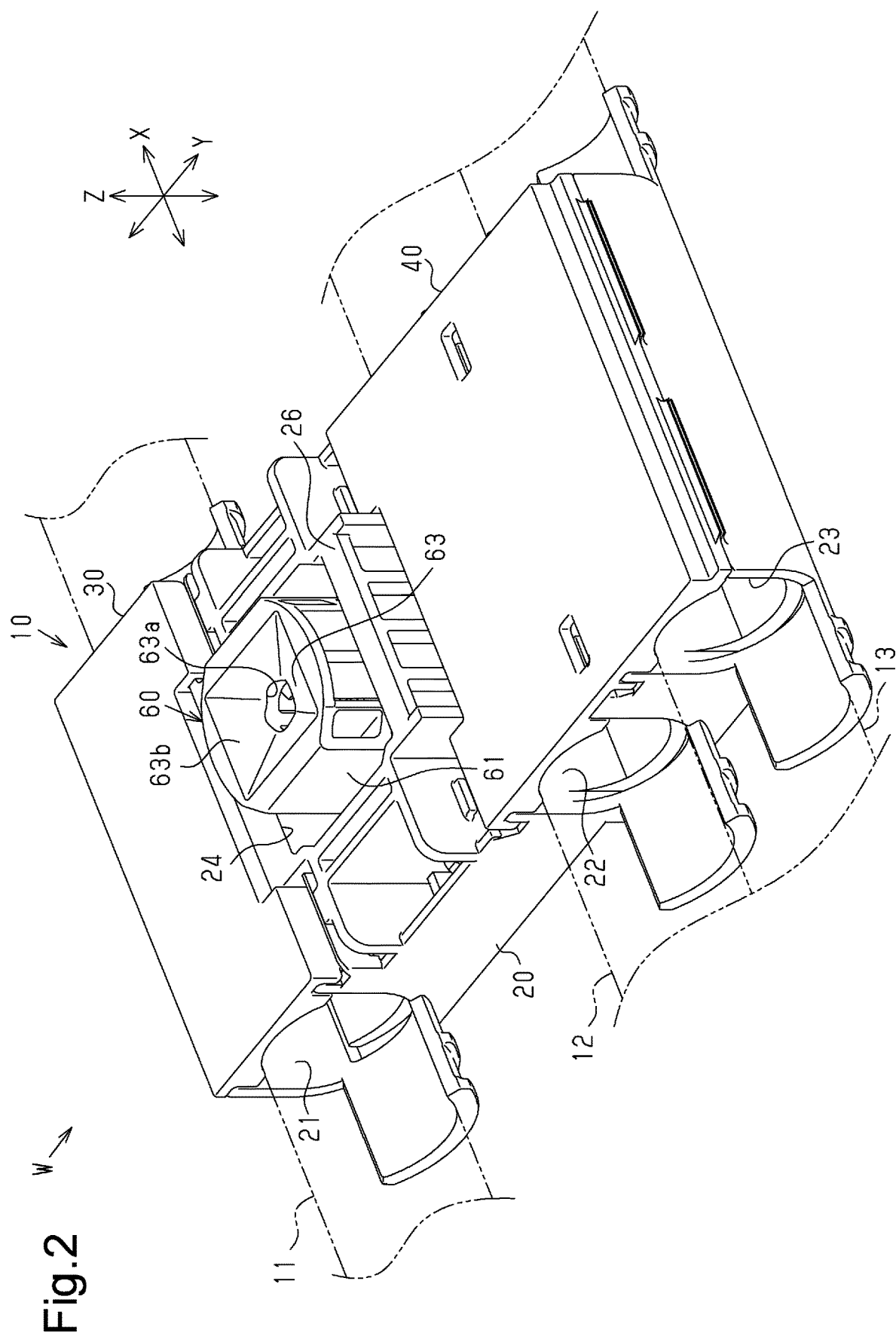
FIG. 2 is a perspective top view illustrating the typical configuration of the clamp according to the embodiment.
Figure 3:
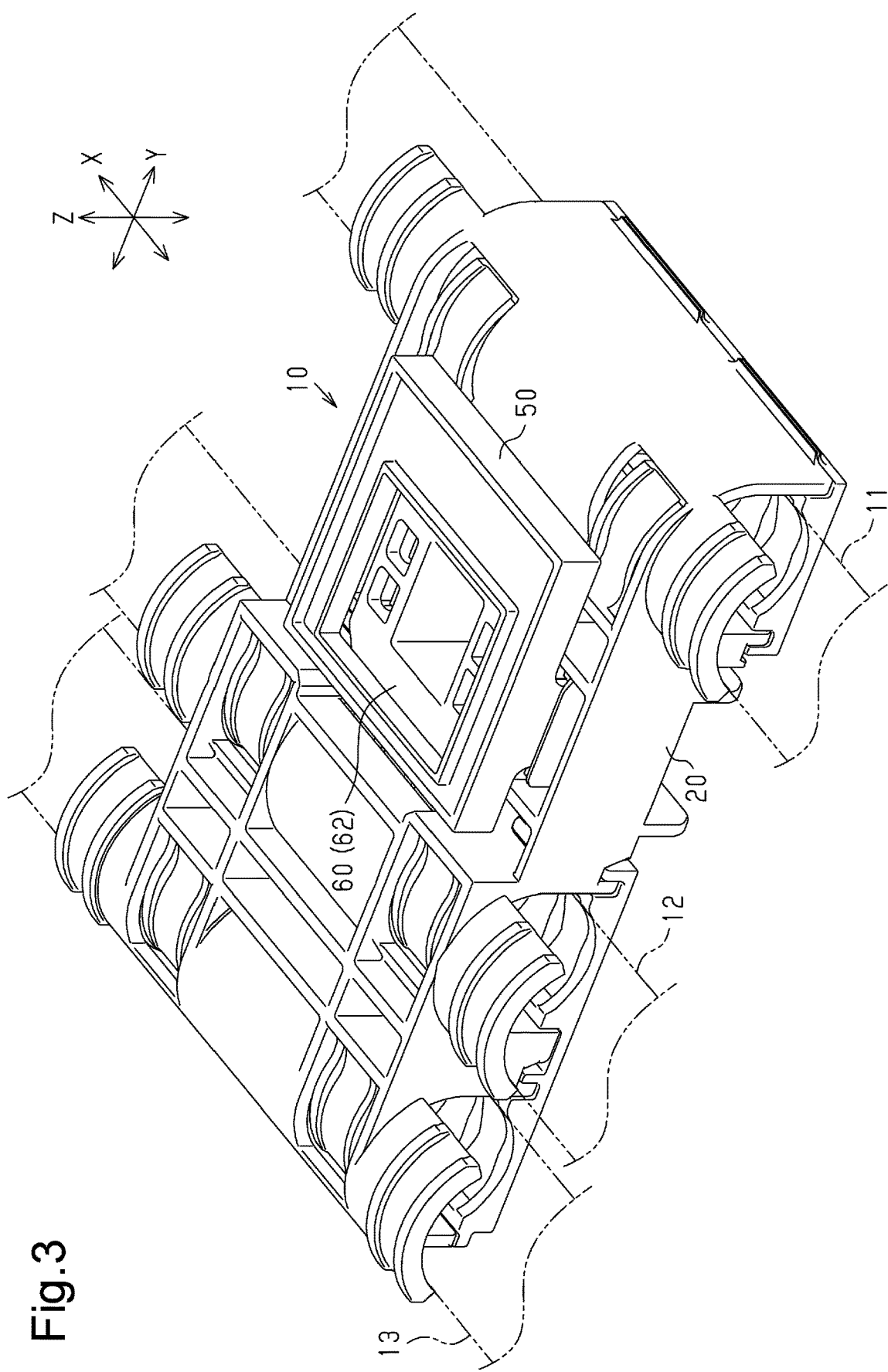
FIG. 3 is a perspective bottom view illustrating the typical configuration of the clamp according to the embodiment.

As shown in FIGS. 2 and 3, the clamp 10 includes a clamp body 20, which holds the tubular members 11 to 13, and a core block 60, which is a component separate from the clamp body 20. As shown in FIG. 3, the clamp 10 includes a cover 50, which is attached to the clamp body 20 to cover the core block 60. The clamp body 20 and the cover 50 are made of plastic. The plastic may be, for example, nylon 66, polyolefin, polyamide, polyester, and ABS plastic. The material for the clamp body 20 and the cover 50 may be a plastic that is prepared by mixing plastic such as nylon 66, polyolefin, polyamide, polyester, or ABS plastic with another plastic.

Configuration of Clamp Body 20

As shown in FIG. 2, the clamp body 20 includes, for example, an opening 21 into which the tubular member 11 is inserted, an opening 22 into which the tubular member 12 is inserted, an opening 23 into which the tubular member 13 is inserted, and a through-hole 24 that extends through the clamp body 20. The openings 21 to 23 are arranged to open in the height direction Z, which is orthogonal to the longitudinal direction of the tubular members 11 to 13. The openings 21 to 23 are arranged to extend, for example, through the clamp body 20 in the longitudinal direction of the tubular members 11 to 13 (the depth direction X in the present embodiment). The openings 21 to 23 are arranged, for example, in the width direction Y. The openings 21, 22 are arranged, for example, in the width direction Y with the through-hole 24 in between. The opening 23 is arranged, for example, to be adjacent to the opening 22 in the width direction Y. The opening 21 is disposed, for example, on one side of the through-hole 24 in the width direction Y, and the openings 22, 23 are disposed, for example, on the other side of the through-hole 24 in the width direction Y.

Configuration of Lids 30, 40

Figure 4:
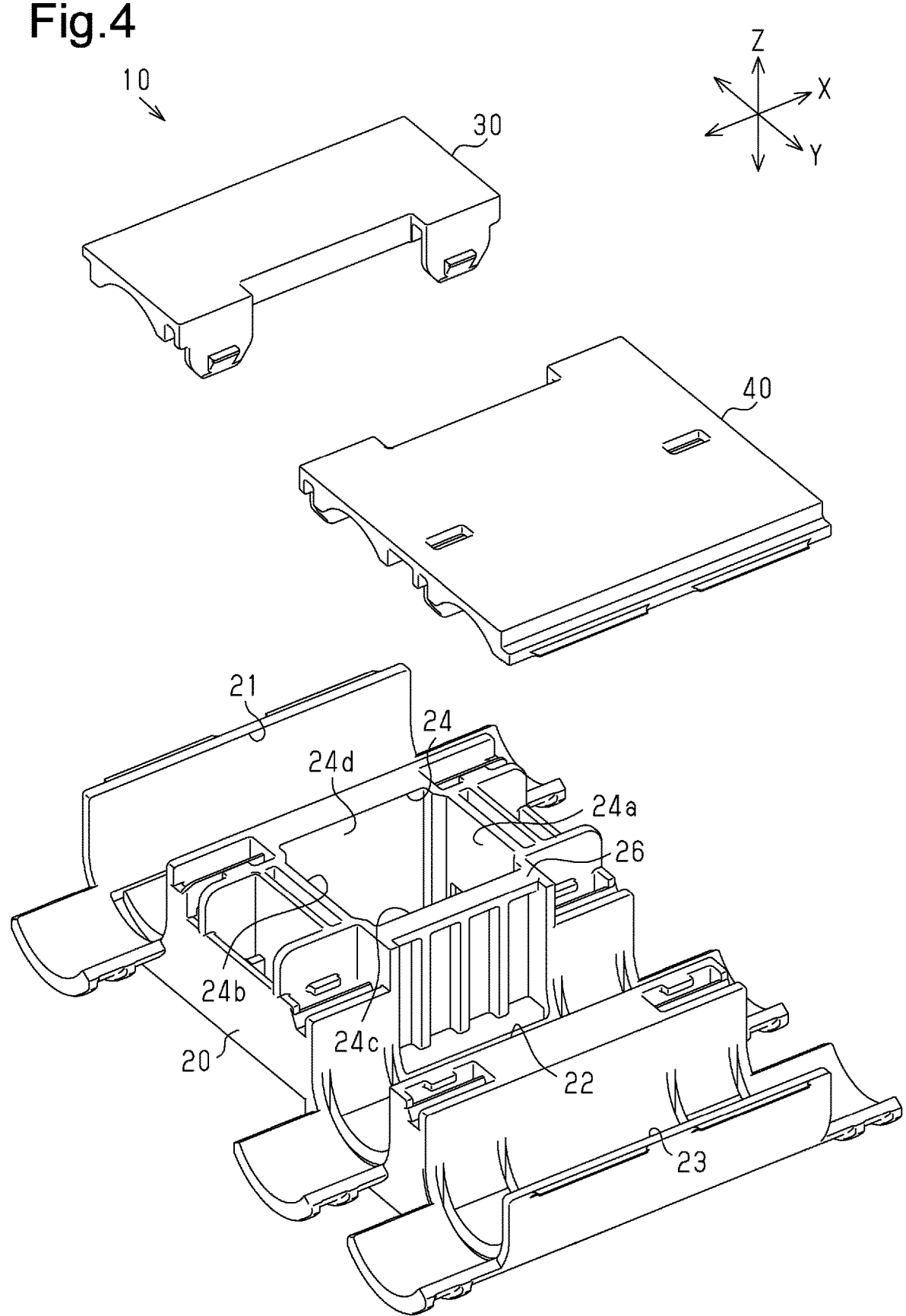
FIG. 4 is an exploded perspective top view illustrating the clamp.

As shown in FIG. 4, the clamp 10 includes a lid 30, which covers the opening 21, and a lid 40, which covers both of the opening 22 and the opening 23. In the clamp 10 of the present embodiment, the lids 30, 40 and the clamp body 20 are provided as separate components. In the clamp 10 of the present embodiment, the lid 30 and the lid 40 are provided as separate components.

The lid 30 is attached to the clamp body 20 so as to close the opening 21, for example, from one side in the height direction Z (from above in the present embodiment). The lid 30 is attached to the clamp body 20, for example, by a snap-fit structure. As shown in FIG. 2, the lid 30 is attached to the clamp body 20 so as to cover the tubular member 11 from above, for example, after the tubular member 11 is inserted into the opening 21 from above. The tubular member 11 is held by, for example, the clamp body 20 and the lid 30.

The lid 40 is attached to the clamp body 20 so as to close both of the openings 22, 23 from, for example, one side in the height direction Z (from above in the present embodiment). The lid 40 is attached to the clamp body 20, for example, by a snap-fit structure. The lid 40 is attached to the clamp body 20 so as to cover the tubular members 12, 13 from above, for example, after the tubular members 12, 13 are inserted into the openings 22, 23 from above. The tubular members 12, 13 are held by, for example, the clamp body 20 and the lid 40.

In place of the configuration in which the lids 30, 40 are provided as components separate from the clamp body 20, a configuration may be employed in which the lids 30, 40 are replaced by lids that are integrated with the clamp body 20, for example, via hinges.

Configuration of Clamp Body 20

Figure 5:
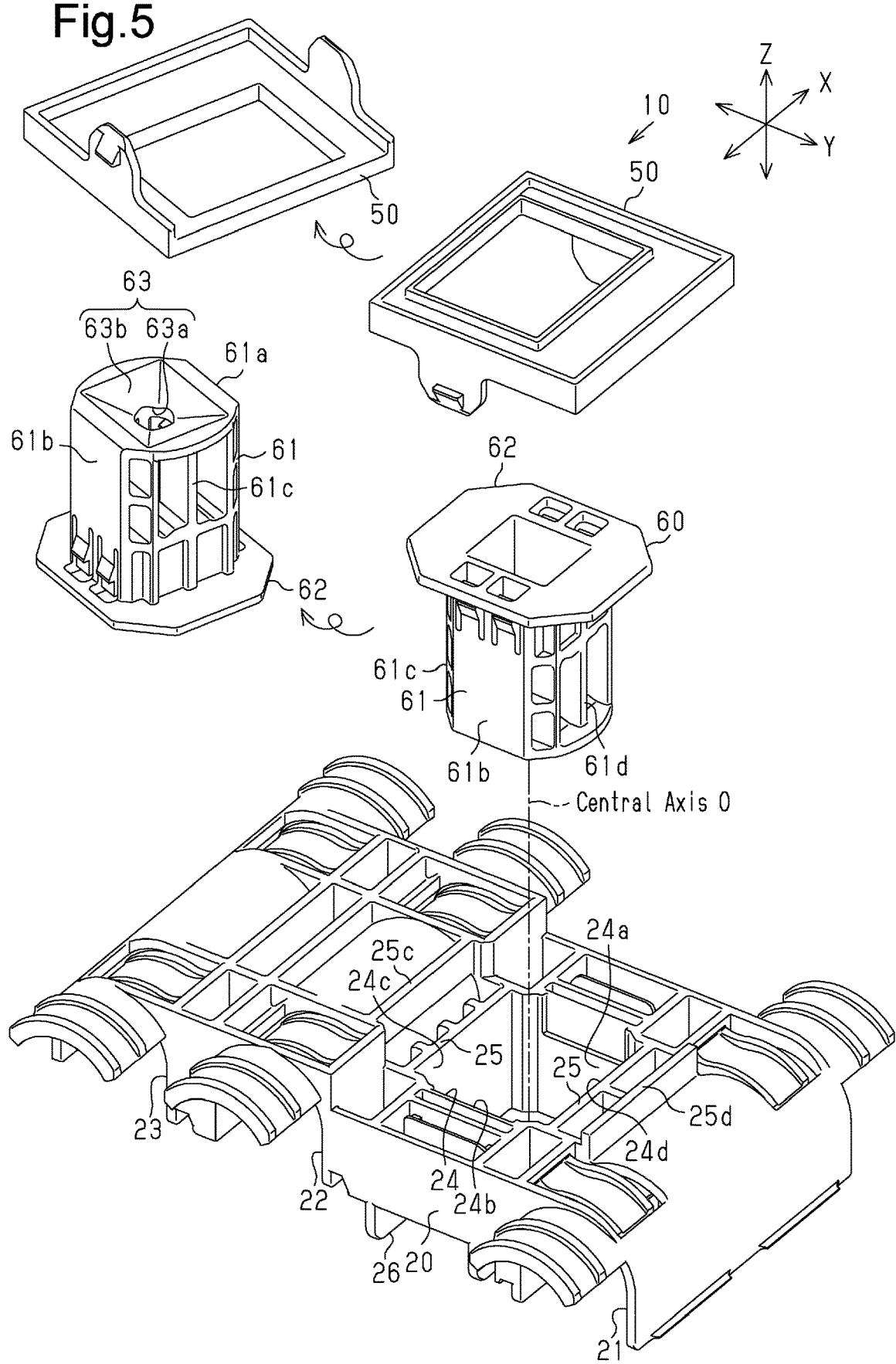
FIG. 5 is an exploded perspective bottom view illustrating the clamp.

As shown in FIG. 5, the clamp body 20 includes the through-hole 24, which accommodates the core block 60, inner surfaces 24a to 24d of the through-hole 24, a bottom surface 25, and an upper surface 26. The inner surfaces 24a to 24d are opposed to the core block 60. The through-hole 24 is provided to extend, for example, through the clamp body 20 in the height direction Z. The through-hole 24 is provided to extend, for example, through the clamp body 20 from the bottom surface 25 to the upper surface 26. The through-hole 24 is shaped like a prism or a column.

Figure 6:
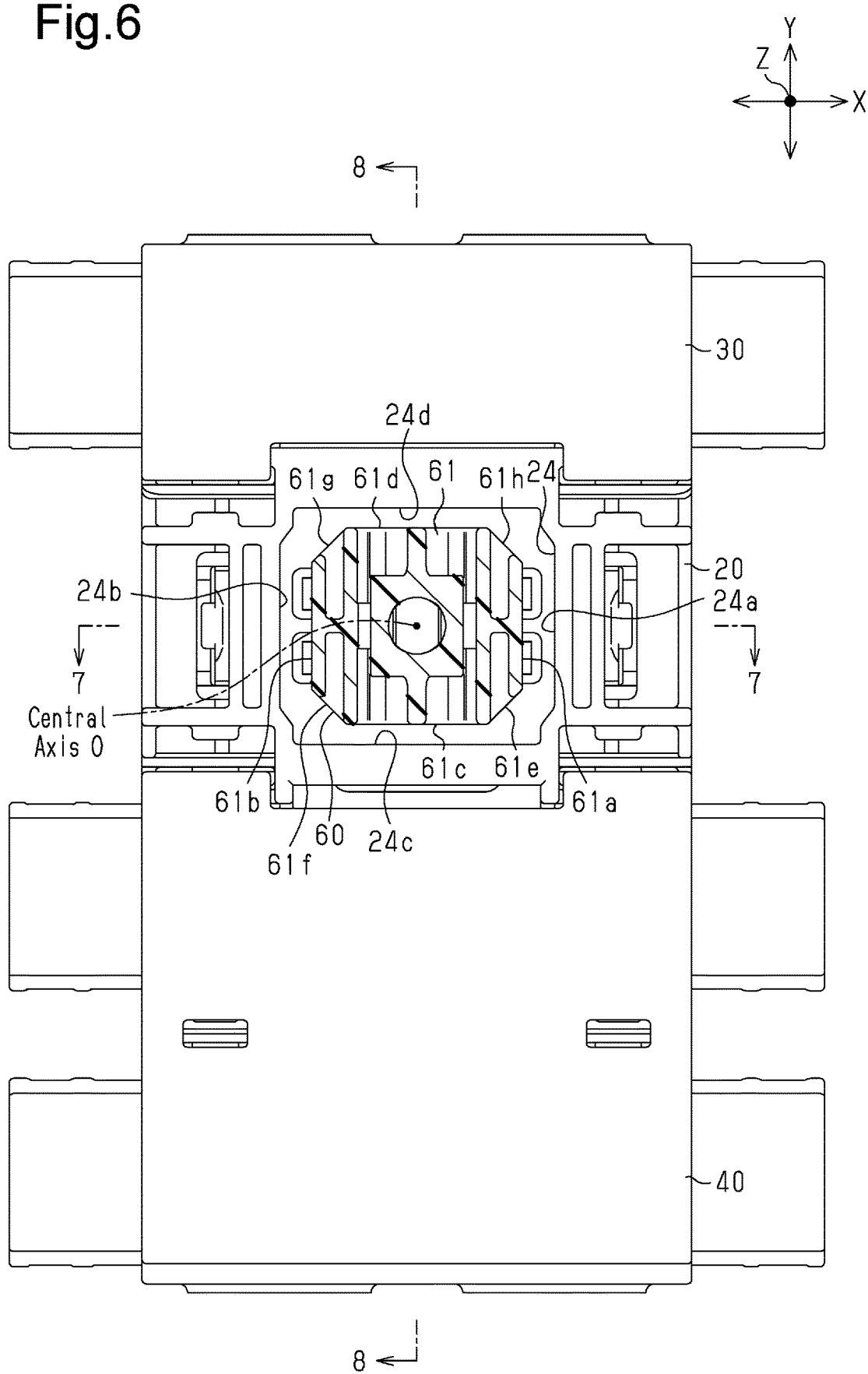
FIG. 6 is a plan view illustrating the clamp.

As shown in FIGS. 5 and 6, the through-hole 24 of the present embodiment is shaped like a quadrangular prism. Accordingly, the through-hole 24 of the present embodiment has the four inner surfaces 24a to 24d. In a plan view as seen in the extending direction (the height direction Z in the present embodiment), the through-hole 24 is shaped, for example, like a rectangle in which the sides extending in the depth direction X are longer than the sides extending in the width direction Y.

The inner surfaces 24a, 24b are arranged to extend, for example, in the width direction Y and in the height direction Z. The inner surfaces 24a, 24b are arranged to spread, for example, on a Y-Z plane. For example, the inner surface 24a and the inner surface 24b are arranged to be opposed to each other in the depth direction X. The inner surfaces 24c, 24d are arranged to extend, for example, in the depth direction X and in the height direction Z. The inner surfaces 24c, 24d are arranged to spread, for example, on an X-Z plane, which is orthogonal to the inner surfaces 24a, 24b. The expression "be opposed to" as used in the present embodiment refers to a state in which surfaces or members are located in front of each other, and includes not only a state in which the two entirely face each other, but also a state in which the two partly face each other. Also, the expression "be opposed to" as used in the present embodiment includes a state in which another member is disposed between the two, as well as a state in which nothing is disposed between the two.

As shown in FIG. 5, the inner surfaces 24a to 24d include a first section and a second section that are symmetric with respect to a central axis O of the through-hole 24. For example, the inner surface 24a corresponds to one example of the first section in the depth direction X, and the inner surface 24b corresponds to one example of the second section in the depth direction X. For example, the inner surface 24c corresponds to one example of the first section in the width direction Y, and the inner surface 24d corresponds to one example of the second section in the width direction Y.

The bottom surface 25 includes projections 25c, 25d. The projections 25c, 25d project in a first direction (the height direction Z in the present embodiment), which is parallel with the direction in which the central axis O extends. The projections 25c, 25d are provided to project downward, for example, along the height direction Z. The projections 25c, 25d are provided, for example, on the bottom surface 25, which is located in the vicinity of the through-hole 24. The projections 25c, 25d are arranged at a predetermined distance from the through-hole 24 in the width direction Y. The projections 25c, 25d are provided to extend, for example, in the depth direction X. The dimension of the projections 25c, 25d in the depth direction X is set to be equal to the dimension of the inner surfaces 24c, 24d of the through-hole 24 in the depth direction X.

The core block 60 includes a body portion 61, which is accommodated in the through-hole 24, a protrusion 62, which protrudes in a direction orthogonal to the central axis O, and a coupling portion 63, which is coupled to an object of installation such as a vehicle body. The core block 60 is a single component in which, for example, the body portion 61, the protrusion 62, and the coupling portion 63 are integrated. The body portion 61 is shaped like a pillar that extends, for example, in the height direction Z. The protrusion 62 is provided, for example, at one end (the lower end in the present embodiment) of the body portion 61 in the longitudinal direction, and the coupling portion 63 is provided, for example, at the other end (the upper end in the present embodiment) of the body portion 61 in the longitudinal direction. The core block 60 is inserted into the through-hole 24 from the bottom surface 25 toward the upper surface 26 of the clamp body 20 with the upper end, at which the coupling portion 63 is provided, faces upward.

The core block 60 is made of plastic. The material for the core block 60 may be, for example, a plastic that includes crystalline plastic as the main component. The material for the core block 60 may be, for example, a plastic that has high mechanical properties such as high stiffness and high impact resistance. Thus, the material for the core block 60 may be a plastic that includes, for example, a polyacetal plastic as the main component. Polyacetal plastic is a crystalline polymer that includes an oxymethylene group as a repeating unit in the polymer chain. Polyacetal plastic may be a homopolymer in which the main chain includes only a carbon-oxygen bond or a copolymer in which the main chain also includes a carbon-carbon bond. As polyacetal plastic, a commercially available product such as IUPITAL (trade name) manufactured by Mitsubishi Engineering-Plastic Corporation or DURACON (trade name) manufactured by Polyplastics may be used.

Configuration of Body Portion 61

As shown in FIG. 6, the body portion 61 is shaped like a prism or a column. The body portion 61 of the present embodiment is shaped like a polygonal prism. The body portion 61 of the present embodiment is shaped as an octagon in a plan view as seen in the height direction Z. The body portion 61 includes, for example, multiple (eight in the present embodiment) outer surfaces 61a to 61h. The body portion 61 is smaller than the through-hole 24, for example, in a plan view as seen in the height direction Z. The dimension of the body portion 61 in the height direction Z is set to be greater than, for example, the dimension of the through-hole 24 in the height direction Z. As shown in FIG. 2, the upper end of the body portion 61 protrude upward from the upper surface 26 of the clamp body 20.

As shown in FIG. 6, the outer surface 61a is provided to be opposed to, for example, the inner surface 24a of the through-hole 24. The outer surface 61b is provided to be opposed to, for example, the inner surface 24b of the through-hole 24. The outer surfaces 61a, 61b are arranged to spread, for example, on the Y-Z plane. The outer surface 61c is provided to be opposed to, for example, the inner surface 24c of the through-hole 24. The outer surface 61d is provided to be opposed to, for example, the inner surface 24d of the through-hole 24. The outer surfaces 61c, 61d are arranged to spread, for example, on an X-Z plane. The dimension of the outer surfaces 61c, 61d in the depth direction X is set to be greater than, for example, the dimension of the outer surfaces 61a, 61b in the width direction Y. The outer surface 61e is provided between, for example, the outer surface 61a and the outer surface 61c. The outer surface 61e has a shape obtained by chamfering, for example, the corner between the outer surface 61a and the outer surface 61c. The outer surface 61f is provided between, for example, the outer surface 61b and the outer surface 61c. The outer surface 61f has a shape obtained by chamfering, for example, the corner between the outer surface 61b and the outer surface 61c. The outer surface 61g is provided between, for example, the outer surface 61b and the outer surface 61d. The outer surface 61g has a shape obtained by chamfering, for example, the corner between the outer surface 61b and the outer surface 61d. The outer surface 61h is provided between, for example, the outer surface 61a and the outer surface 61d. The outer surface 61h has a shape obtained by chamfering, for example, the corner between the outer surface 61a and the outer surface 61d. The outer surfaces 61e, 61g are arranged to spread, for example, on a plane that intersects with both of the X-Z plane and the Y-Z plane and extends in the height direction Z. The outer surfaces 61f, 61h are arranged to spread, for example, on a plane that intersects with both of the X-Z plane and the Y-Z plane and is orthogonal to the plane on which the outer surfaces 61e, 61g are provided.

Figure 7:
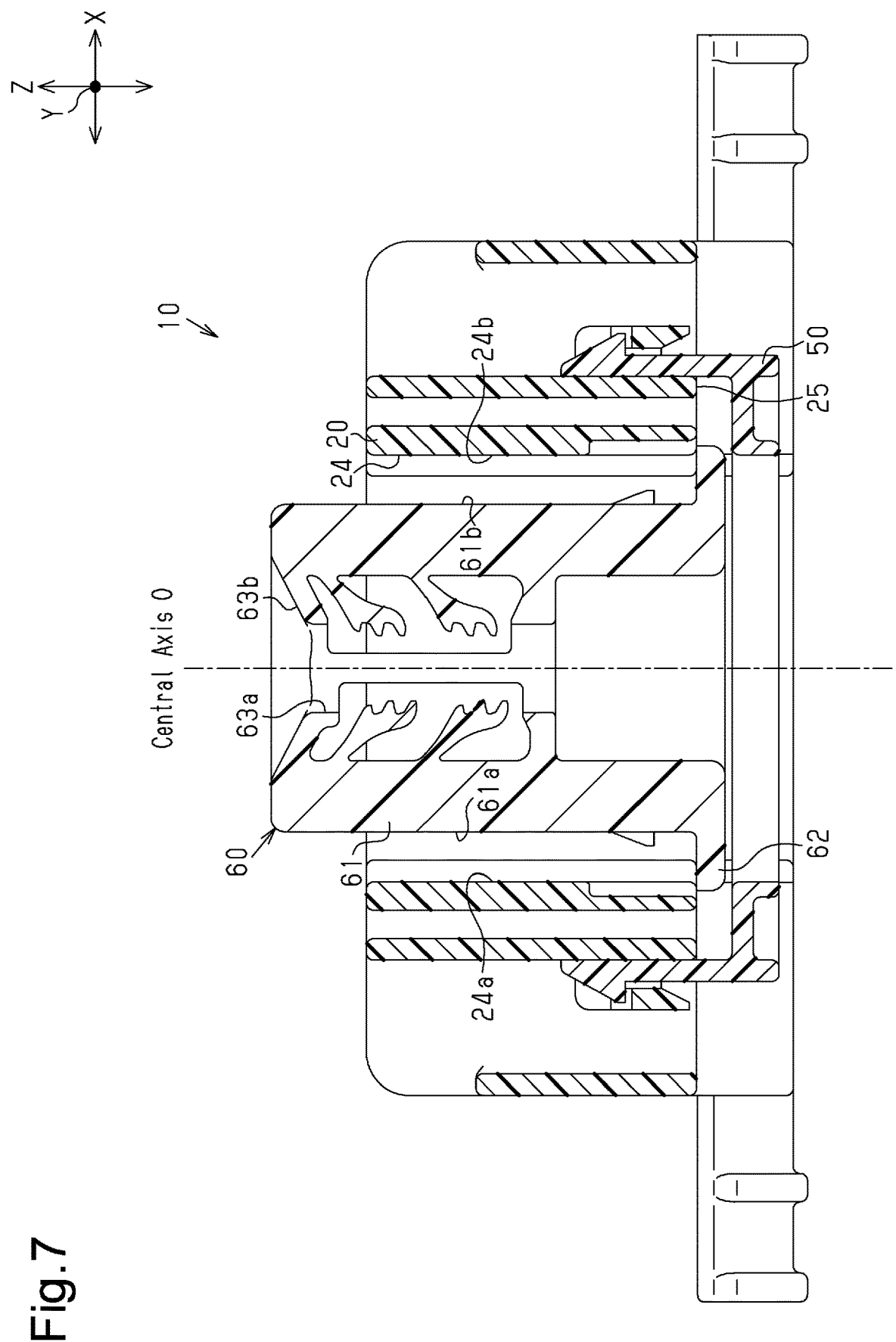
FIG. 7 is a cross-sectional view taken along line 7-7 of FIG. 6, illustrating the clamp.

As shown in FIG. 7, the body portion 61 is configured such that, for example, in the depth direction X, the outer surface 61a is in contact with the inner surface 24a, and the outer surface 61b is separated from, or spaced apart from, the inner surface 24b. In contrast, the body portion 61 is configured such that, for example, in the depth direction X, the outer surface 61b is in contact with the inner surface 24b, and the outer surface 61a is separated from, or spaced apart from, the inner surface 24a. That is, the body portion 61 is configured to be movable between the inner surface 24a and the inner surface 24b of the through-hole 24.

Figure 8:
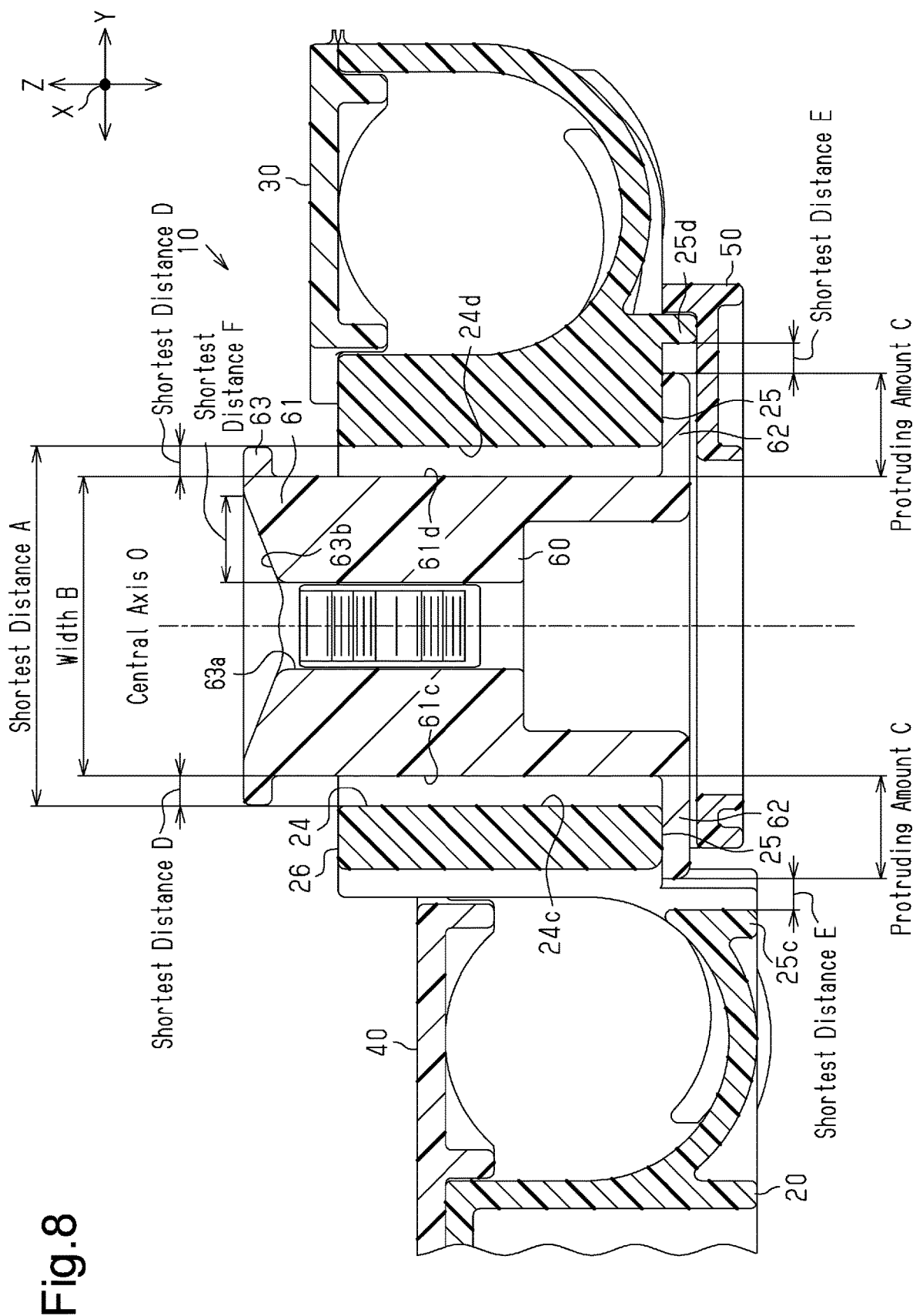
FIG. 8 is a cross-sectional view taken along line 8-8 of FIG. 6, illustrating the clamp.

As shown in FIG. 8, the body portion 61 is configured such that, for example, in the width direction Y, the outer surface 61c is in contact with the inner surface 24c, and the outer surface 61d is separated from, or spaced apart from, the inner surface 24d. In contrast, the body portion 61 is configured such that, for example, in the width direction Y, the outer surface 61d is in contact with the inner surface 24d, and the outer surface 61c is separated from, or spaced apart from, the inner surface 24c. That is, the body portion 61 is configured to be movable between the inner surface 24c and the inner surface 24d of the through-hole 24.

The outer surfaces 61e to 61h, which are shown in FIG. 6, function as rotation preventing surfaces that contact the inner surfaces 24a to 24d, for example, when the core block 60 rotates about the central axis O. For example, when the core block 60 in the position shown in FIG. 6 rotates clockwise about the central axis O, a surface contact is established between the outer surface 61e and the inner surface 24c and between the outer surface 61g and the inner surface 24d. The contact between the outer surfaces 61e, 61g and the inner surfaces 24c, 24d restricts further rotation of the core block 60. For example, when the core block 60 in the position shown in FIG. 6 rotates counterclockwise about the central axis O, a surface contact is established between the outer surface 61f and the inner surface 24c and between the outer surface 61h and the inner surface 24d. The contact between the outer surfaces 61f, 61h and the inner surfaces 24c, 24d restricts further rotation of the core block 60. The outer surfaces 61a to 61d, which are not rotation preventing surfaces, are located on both sides of the outer surfaces 61e to 61h, which are rotation preventing surfaces.

Configuration of Protrusion 62

As shown in FIG. 5, the protrusion 62 protrudes, for example, from the outer surfaces 61a to 61h in directions orthogonal to a central axis direction, in which the central axis O extends. The protrusion 62 is continuous, for example, over the entire perimeter of the body portion 61. That is, the protrusion 62 protrudes from the outer surfaces 61a to 61h over the entire perimeter of the body portion 61. The protrusion 62 is larger than the through-hole 24, for example, in a plan view as seen in the height direction Z.

As shown in FIGS. 7 and 8, the protrusion 62 is arranged to be opposed to, for example, the bottom surface 25 of the clamp body 20. For example, the upper surface of the protrusion 62 is opposed to the bottom surface 25. For example, the upper surface of the protrusion 62 is in contact with the bottom surface 25. As shown in FIG. 8, the dimension of the protrusion 62 in the height direction Z is set to be smaller the dimension of the projection 25d on the bottom surface 25 in the height direction Z. In other words, the projection 25d projects from the thickness of the protrusion 62 in the first direction (the height direction Z in the present embodiment), which is parallel with the central axis direction, in which the central axis O of the through-hole 24 extends. The side surface of the protrusion 62 is opposed to, for example, the projections 25c, 25d.

Configuration of Coupling Portion 63

The coupling portion 63 is provided at one end (the upper end in the present embodiment) of the body portion 61 in the longitudinal direction (the height direction Z in the present embodiment). Specifically, the coupling portion 63 is provided at the end opposite from the protrusion 62. The coupling portion 63 is disposed at, for example, a position that protrudes from the upper surface 26 of the clamp body 20. The coupling portion 63 includes a coupling hole 63a, which is used to couple the coupling portion 63 to an object of installation such as a vehicle body, and inclined surfaces 63d adjacent to the coupling hole 63a. The coupling hole 63a is provided to extend, for example, in the height direction Z. The coupling hole 63a is provided substantially at the center of the coupling portion 63 in a plan view as seen in the height direction Z. The coupling hole 63a receives, for example, a fastener (not shown) such as a stud bolt of the object of installation.

As shown in FIG. 2, the inclined surfaces 63b are inclined, for example, to be recessed toward the coupling hole 63a. The inclined surfaces 63b are inclined, for example, to be recessed downward from the upper surface of the coupling portion 63 toward the coupling hole 63a. The inclined surfaces 63b are provided to encompass, for example, the entire perimeter of the coupling hole 63a. The inclined surfaces 63b are shaped as, for example, a rectangle in a plan view as seen in the height direction Z. The inclined surfaces 63b of the present embodiment are inclined to be recessed toward the coupling hole 63a from the four sides. That is, the coupling portion 63 includes four inclined surfaces 63b.

Configuration of Cover 50

As shown in FIG. 5, the cover 50 is attached to, for example, the bottom surface 25 of the clamp body 20. The cover 50 is, for example, a component separate from the clamp body 20. The cover 50 is provided to partly cover, for example, the core block 60. The cover 50 is attached to the bottom surface 25 of the clamp body 20 so as to hold a part of the protrusion 62 of the core block 60 between the cover 50 and the bottom surface 25. The cover 50 is attached to the clamp body 20 from below by a snap-fit structure so as to cover the core block 60, for example, after the core block 60 is accommodated in the through-hole 24.

As shown in FIG. 8, the upper surface of the cover 50 is opposed to, for example, the lower surface of the protrusion 62. The upper surface of the cover 50 is opposed to, for example, a part of the protrusion 62 that protrudes further in the width direction Y than the outer surfaces 61c, 61d. The cover 50 is provided to cover, for example, the projection 25d on the bottom surface 25. The upper surface of the cover 50 is opposed to, for example, the lower surface of the projection 25d. The upper surface of the cover 50 is in contact with, for example, the lower surface of the projection 25d. The upper surface of the cover 50 is not in contact with, for example, the lower surface of the protrusion 62. In this case, the protrusion 62 is accommodated between the bottom surface 25 of the clamp body 20 and the cover 50.

A cross section that includes the inner surface 24c (the first section in the width direction Y) and the inner surface 24d (the second section in the width direction Y) and is orthogonal to the central axis O will be referred to as a first cross section. In the first cross section, the shortest distance between the inner surfaces 24c, 24d will be referred to as a shortest distance A. The width of the body portion 61 in the first cross section will be referred to as a width B. The protruding amount of the protrusion 62 from the outer surfaces 61c, 61d will be referred to as a protruding amount C. The clamp 10 is configured such that the shortest distance A, the width B, and the protruding amount C satisfy Expression 1.

$$C > A - B \qquad \text{Expression 1:}$$

Since Expression 1 is satisfied, the core block 60 is movable between the inner surface 24c and the inner surface 24d in a state in which the protrusion 62 is capable of supporting the bottom surface 25. In other words, since Expression 1 is satisfied, the protrusion 62 is allowed to be partly opposed to the bottom surface 25 in the entire region in which the core block 60 moves in the width direction Y between the inner surface 24c and the inner surface 24d. The shortest distance A between the inner surfaces 24c, 24d and the width B of the body portion 61 of the core block 60 satisfy the expression A>B.

The shortest distance in the first cross section between the inner surfaces 24c, 24d and the outer surfaces 61c, 61d of the body portion 61 will be referred to as a shortest distance D. The shortest distance between the projections 25c, 25d at the distal end of the protrusion 62 will be referred to as a shortest distance E. The clamp 10 is configured such that the shortest distance D and the shortest distance E satisfy Expression 2.

$$E \geq D \qquad \text{Expression 2:}$$

The shortest distance in the first cross section from one end to the other end (from the upper end to the lower end in the present embodiment) of the inclined surface 63b in a direction orthogonal to the central axis O (the width direction Y in the present embodiment) will be referred to as a shortest distance F. The clamp 10 is configured such that the shortest distance A, the width B, and the shortest distance F satisfy Expression 3.

$$F \geq A - B \qquad \text{Expression 3:}$$

As described above, the present embodiment has the following operational advantages.

(1) Referring to FIG. 8, the core block 60, which includes the coupling portion 63 to be coupled to an object of installation such as a vehicle body, has the protrusion 62. The protrusion 62 is opposed to the bottom surface 25 of the clamp body 20 so as to support the clamp body 20. This provides a structure that prevents the clamp body 20 from falling off the core block 60. Further, the core block 60 is configured such that, when, for example, the outer surface 61c of the body portion 61 contacts the inner surface 24c of the through-hole 24 of the clamp body 20, the outer surface 61d of the body portion 61 is separated from, or spaced apart from the inner surface 24d of the through-hole 24. That is, the core block 60 is configured to be movable between the inner surface 24c and the inner surface 24d of the through-hole 24 of the clamp body 20. Accordingly, the clamp 10 is provided, which allows for position adjustment with respect to an object of installation to absorb, for example, dimensional tolerances between the clamp 10 and the object of installation.

(2) The core block 60 contains, as the main component, polyacetal plastic, which is a crystalline plastic. Thus, the high self-lubricating property of the crystalline plastic achieves high abrasion resistance and high wear resistance. Further, since the polyacetal plastic has high mechanical properties such as high stiffness and high impact resistance, the configuration is favorable to provide strength to support the clamp body 20 with the protrusion 62.

(3) Since the protrusion 62 of the core block 60 is accommodated between the clamp body 20 and the cover member 50, the core block 60 is prevented from falling off the clamp body 20 before the clamp 10 is installed in the object of installation. This increases the ease of operation when the clamp 10 is fixed to the object of installation.

(4) Since the cover 50 first contacts the projection 25d before contacting the core block 60, the cover 50 is prevented from hindering movement of the core block 60.

(5) Since the coupling portion 63 of the core block 60 has the inclined surfaces 63b, a fastener such as a bolt that protrudes from the object of installation can be guided into the coupling hole 63a of the core block 60.

(6) The outer surfaces 61e to 61h (refer to FIG. 6) prevent the clamp body 20 from rotating relative to the core block 60 after the clamp 10 is fixed to the object of installation with the coupling portion 63 of the core block 60. That is, since rotation of the wire harness W is prevented after the clamp 10 is fixed to the object of installation, the ease of installing the wire harness W is increased. Also, since a surface contact is established between the inner surfaces 24a to 24d and the outer surfaces 61e to 61h, the force that is generated when the wire harness W rotates is dispersed. This prevents the core block 60 and the clamp body 20 from being damaged.

(7) Referring to FIG. 8, the clamp 10 is configured to satisfy Expression 1 (C>A−B). Thus, the protrusion 62 of the core block 60 is always opposed to the bottom surface 25 of the clamp body 20 to be able to always support the clamp body 20 even in a case in which the core block 60 is moved freely on the X-Y plane. This provides a structure that prevents the clamp body 20 from falling off the core block 60.

(8) Referring to FIG. 8, the clamp 10 is configured to satisfy Expression 2 (E≥D). Thus, the outer surfaces 61c, 61d of the body portion 61 of the core block 60 and the inner surfaces 24c, 24d of the clamp body 20 contact each other before the distal end of the protrusion 62 and the projection 25d contact each other even in a case in which the core block 60 is moved freely on the X-Y plane. This establishes a surface contact between the body portion 61 of the core block 60 and the clamp body 20.

(9) Referring to FIG. 8, the clamp 10 is configured to satisfy Expression 3 (F≥A−B). Thus, in the entire range of movement of the core block 60 relative to the clamp body 20, for example, the distal end of the stud bolt, which protrudes from the object of installation, is always in contact with the inclined surface 63b of the recess of the core block 60. Thus, the distal end of the stud bolt can be guided to the coupling hole 63a along the inclined surface 63b of the recess of the core block 60. This increases the ease of installing the clamp in the object of installation.

(10) The use of the clamp 10 provides the wire harness W, which allows for position adjustment with respect to an object of installation.

OTHER EMBODIMENTS

The above-described embodiment may be modified as follows. The above-described embodiment and the following modifications can be combined as long as the combined modifications remain technically consistent with each other.

In the above-described embodiment, the cover 50 is provided to be opposed to only the projection 25d of the projections 25c, 25d. However, the configuration is not limited to this. For example, the cover 50 may be provided to be opposed to both of the projections 25c, 25d.

In the above-described embodiment, the projections 25c, 25d are provided at positions separated from, or spaced apart from the through-hole 24 in the width direction Y. However, the configuration is not limited. For example, a projection similar to the projections 25c, 25d may be provided at a position separated from, or spaced apart from the through-hole 24 in the depth direction X.

In place of the projections 25c, 25d on the bottom surface 25 of the clamp body 20, the cover 50 may have a projection that projects toward the bottom surface 25 of the clamp body 20.

The projections 25c, 25d of the above-described embodiment may be omitted.

The shortest distance A, the width B, and the protruding amount C may be set freely in ranges in which the clamp 10 satisfies Expression 1 (C>A−B).

The shortest distance D and the shortest distance E are preferably set in ranges in which the clamp 10 satisfies Expression 2 (E≥D).

The shortest distance A, the width B, and the shortest distance F are preferably set in ranges in which the clamp 10 satisfies Expression 3 (F≥A−B).

The above-described embodiment is configured such that the core block 60 is moved freely on the X-Y plane in the through-hole 24. However, the configuration is not limited to this. For example, the core block 60 may be movable only in the width direction Y in the through-hole 24. Further, the core block 60 may be movable only in the depth direction X in the through-hole 24.

In the above embodiment, the shapes of the outer surfaces 61e to 61h, that is, the shapes of the rotation preventing surfaces are not particularly limited. For example, the rotation preventing surfaces may have shapes that protrude further outward from the other outer surfaces 61a to 61d.

The outer surfaces 61e to 61h of the core block 60 in the above-described embodiment may be omitted.

The cover 50 of the above-described embodiment may be omitted.

The lids 30, 40 of the above-described embodiment may be omitted.

The number of the tubular members held by the clamp 10 of the above-described embodiment is not particularly limited. The number of the tubular members held by the clamp 10 may be, for example, one, two or more than three.

DESCRIPTION OF THE REFERENCE NUMERALS 1-3 . . . Electric Wires
10 . . . Clamp
11-13 . . . Tubular Members
20 . . . Clamp Body 21-23 . . . Openings
24 . . . Through-Hole
24a-24d . . . Inner Surfaces (First Section, Second Section)
25 . . . Bottom Surface
25c, 25d . . . Projections
30 . . . First Lid
40 . . . Second Lid
50 . . . Cover
60 . . . Core block
61 . . . Body Portion
61a-61d . . . Outer Surfaces
61e-61h . . . Outer Surfaces (Rotation Preventing Surfaces)
62 . . . Protrusion
63 . . . Coupling Portion
63a . . . Coupling Hole
63b . . . Inclined Surfaces
A . . . Shortest Distance
B . . . Width
C . . . Protruding Amount
D . . . Shortest Distance
E . . . Shortest Distance
F . . . Shortest Distance
M1-M4 . . . Devices
O . . . Central Axis
V . . . Vehicle
W . . . Wire Harness Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A clamp that is configured to hold a tubular member accommodating an electric wire and be fixed to an object of installation, the clamp comprising:
   a clamp body configured to hold the tubular member;
   a core that is a component separate from the clamp body; and
   a cover that is configured to be attached to the clamp body and cover the core,
   wherein
   the clamp body includes:
      a through-hole configured to accommodate the core,
      an inner surface configured to be opposed to the core in the through-hole, and
      a bottom surface,
   the core includes:
      a body portion configured to be accommodated in the through-hole,
      a coupling portion configured to be coupled to the object of installation, and
      a protrusion that protrudes in a direction orthogonal to a central axis of the through-hole,
   the protrusion is opposed to the bottom surface,
   the inner surface includes a first section and a second section that are symmetric with respect to the central axis,
   the body portion is configured to be separated from the second section when the body portion contacts the first section, and
   the protrusion is configured to be accommodated between the bottom surface and the cover.

2. The clamp according to claim 1, wherein the core contains, as a main component, polyacetal plastic.

3. The clamp according to claim 1, wherein
   the bottom surface includes a projection that projects in a first direction, the first direction being parallel with a direction in which the central axis extends, and
   the amount by which the projection projects is greater than a thickness of the protrusion in the first direction.

4. The clamp according to claim 1, wherein
   the coupling portion includes:
      a coupling hole used to couple the coupling portion to the object of installation, and
      an inclined surface adjacent to the coupling hole, and
   the inclined surface is inclined so as to be recessed toward the coupling hole.

5. The clamp according to claim 1, wherein
   the through-hole is shaped like a quadrangular prism,
   the body portion is shaped like a polygonal prism and includes multiple outer surfaces, and
   the outer surfaces include a rotation preventing surface configured to contact the inner surface in a situation in which the core rotates about the central axis of the core.

6. The clamp according to claim 1, wherein
   the inner surface is one of two inner surfaces, and
   in a cross section that includes the first section and the second section and is orthogonal to the central axis, a shortest distance A between the two inner surfaces, a width B of the body portion, and a protruding amount C of the protrusion satisfy an expression $C>A-B$.

7. The clamp according to claim 3, wherein, in a cross section that includes the first section and the second section and is orthogonal to the central axis, a shortest distance D between the inner surface and the body portion and a shortest distance E between a distal end of the protrusion and the projection satisfy an expression $E \geq D$.

8. The clamp according to claim 4, wherein
   the inner surface is one of two inner surfaces, and
   in a cross section that includes the first section and the second section and is orthogonal to the central axis, a shortest distance A between the two inner surfaces, a width B of the body portion, and a shortest distance F from one end to another end of the inclined surface in a direction orthogonal to the central axis satisfy an expression $F \geq A-B$.

9. A wire harness comprising:
   the clamp according to claim 1;
   the electric wire; and
   a tubular member configured to accommodate the electric wire.

10. A clamp that is configured to hold a tubular member accommodating an electric wire and be fixed to an object of installation, the clamp comprising:
    a clamp body configured to hold the tubular member;
    a core that is a component separate from the clamp body; and a cover that is configured to be attached to the clamp body and cover the core, wherein the clamp body includes:
a through-hole configured to accommodate the core,
an inner surface configured to be opposed to the core in the through-hole, and
a bottom surface, the core includes:
a body portion configured to be accommodated in the through-hole,
a coupling portion configured to be coupled to the object of installation, and
a protrusion that protrudes in a direction orthogonal to a central axis of the through-hole, the inner surface includes a first section and a second section that are symmetric with respect to the central axis, the core is configured to be movable between the first section and the second section in a state in which the protrusion is capable of supporting the bottom surface, and the protrusion is configured to be accommodated between the bottom surface and the cover.

11. The clamp according to claim 10, wherein the core contains, as a main component, polyacetal plastic.

12. The clamp according to claim 10, wherein
the bottom surface includes a projection that projects in a first direction, the first direction being parallel with a direction in which the central axis extends, and
the amount by which the projection projects is greater than a thickness of the protrusion in the first direction.

13. The clamp according to claim 10, wherein
the coupling portion includes:
a coupling hole used to couple the coupling portion to the object of installation, and
an inclined surface adjacent to the coupling hole, and
the inclined surface is inclined so as to be recessed toward the coupling hole.

14. The clamp according to claim 10, wherein
the through-hole is shaped like a quadrangular prism,
the body portion is shaped like a polygonal prism and includes multiple outer surfaces, and
the outer surfaces include a rotation preventing surface configured to contact the inner surface in a situation in which the core rotates about the central axis of the core.

15. The clamp according to claim 10, wherein
the inner surface is one of two inner surfaces, and
in a cross section that includes the first section and the second section and is orthogonal to the central axis, a shortest distance A between the two inner surfaces, a width B of the body portion, and a protruding amount C of the protrusion satisfy an expression $C > A - B$.

16. The clamp according to claim 12, wherein, in a cross section that includes the first section and the second section and is orthogonal to the central axis, a shortest distance D between the inner surface and the body portion and a shortest distance E between a distal end of the protrusion and the projection satisfy an expression $E \geq D$.

17. The clamp according to claim 13, wherein
the inner surface is one of two inner surfaces, and
in a cross section that includes the first section and the second section and is orthogonal to the central axis, a shortest distance A between the two inner surfaces, a width B of the body portion, and a shortest distance F from one end to another end of the inclined surface in a direction orthogonal to the central axis satisfy an expression $F \geq A - B$.

18. A wire harness comprising:
the clamp according to claim 10;
the electric wire; and
a tubular member configured to accommodate the electric wire.

* * * * *